Figure 1:
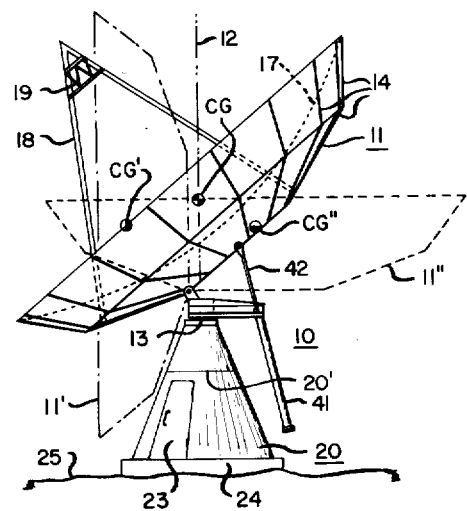

Oct. 23, 1962 E. W. POTTMEYER 3,059,889
TRACKING MOUNT
Filed June 24, 1960

INVENTOR
Edward W. Pottmeyer
Hooper, Leonard & Buell
his attorneys

United States Patent Office 3,059,889
Patented Oct. 23, 1962

3,059,889
TRACKING MOUNT
Edward W. Pottmeyer, Fox Chapel Borough, Pa., assignor to Blaw-Knox Company, Pittsburgh, Pa., a corporation of Delaware
Filed June 24, 1960, Ser. No. 38,600
5 Claims. (Cl. 248—183)

This invention relates to a mount for tracking antenna and other off-center structures moved about a plurality of axes for azimuth and elevation positioning. More particularly, this invention pertains to a tracking mount for generally parabolic antenna and reflectors utilizable in microwave radar, radio and astronomical fields to provide relatively well-balanced, fast and stable predetermined movements thereof.

"Big dish" antennas and reflectors are employed for microwave tracking, detection, communication and other purposes and are asymmetrical structures except about the axis of revolution in the case of those of general parabolic shape. They present a considerable number of problems of static and dynamic stress for purposes of stability and movement in azimuth, or elevation, or both, and in guarding against overturning or being overturned. The size of such dishes and the need for rigidity therein augment such problems despite the general practice of constructing such dishes with a latticework construction. As a consequence, pedestals and mounts for such dishes are relatively high and the dishes routinely employ counterweights with elevation-azimuth types to try to compensate for the torque and moments which occur due to various kinds of loads and the directions and magnitudes of forces including wind to which such constructions are subject. Such a counterweight must rotate with the dish and has the effect of greatly increasing the inertia of the moving mass and interferes with the achievement of speeds and accelerations needed to track fast moving objects and, further, increase torque and moment forces required to operate the device. Additionally, such counterweights have the effect of increasing the gross weight of the device for a given size and strength.

By means of my invention, parabolic antennas and reflectors and other offset or asymmetrical structures may be mounted for rotation about a plurality of axes and materially overcome or inhibit the aforesaid deficiencies and limitations of prior practices. Thus, an azimuth-elevation mount made in accordance with my invention has a member rotatable about a vertical azimuth axis and is pivotally connected to a structure like a parabolic antenna about a horizontal elevation axis below the center of gravity in all positions thereof; and, further, the rear of the crown of the parabola, through the center of which the axis of rotation of the parabola passes, is pivotally connected to extensible link mechanism preferably adjacent such axis level, with the lower portion of the link mechanism pivotally connected to an opposite side of the azimuth axis relative to the elevation axis connection. Thereby, for a given size and rigidity of antenna, there is a materially reduced inertia mass and marked reduction in the torque forces and couples required to operate the device, with greater resistance to overturning. Moreover, at altitudes normally covered by such an antenna, a device mounted in accordance with this invention is relatively well-balanced with the center of gravity of the dish or other asymmetrical structure relatively more directly above the azimuth axis. Still further, considerable savings in headroom and substantial economies in weight of a new structure, other things being substantially equal, are achieved.

Figure 2:
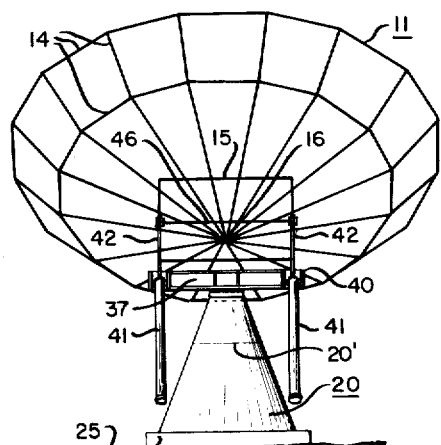
Figure 3:
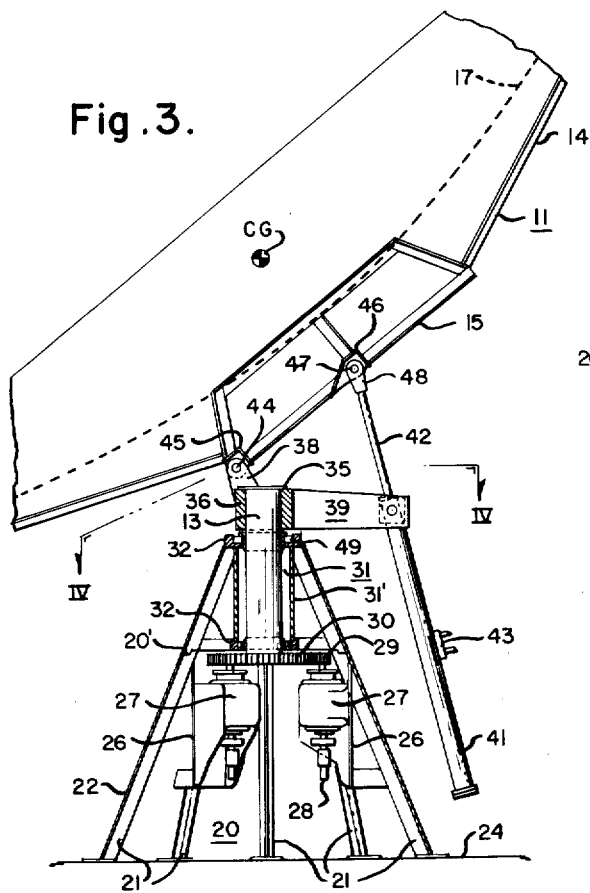
Figure 5:
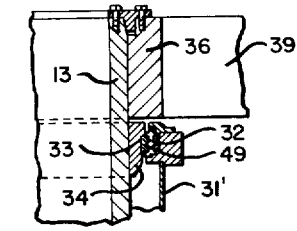
Figure 4:
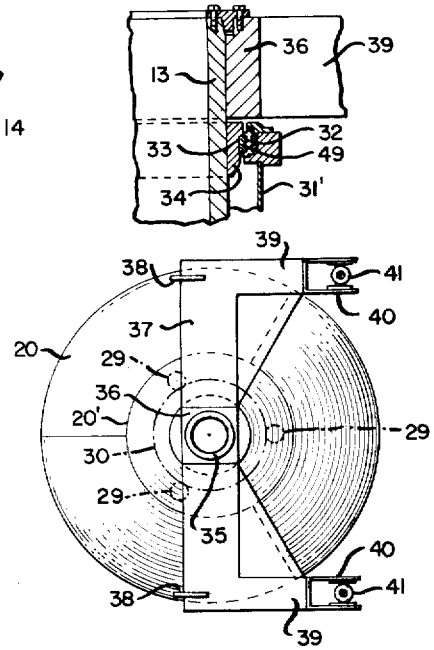

Other objects, features and advantages of this invention will be apparent from the following description and the accompanying drawings, which are illustrative of one embodiment only, in which FIGURE 1 is a side view, in outline, of one azimuth-elevation mount embodiment of this invention inclusive of a tracking antenna;
FIGURE 2 is a rear view of the embodiment shown in FIGURE 1;
FIGURE 3 is a side view, somewhat enlarged and partly in section, of the foregoing embodiment;
FIGURE 4 is a view taken along line IV—IV of FIGURE 3; and
FIGURE 5 is a detail view in section of a part of the upper bearing shown in FIGURE 3.

Referring to the drawings, the illustrated embodiment of my invention comprises a tracking mount 10 having azimuth and elevation mechanism pivotally connected to a tracking antenna 11 to provide a relatively lighter weight, more stable, faster and more readily controllable device. As shown in FIGURE 1, the altitude or elevation of the antenna may be varied as desired between a full horizon position 11' shown in chain line outline in which the axis of the antenna is horizontal and passes through its center of gravity CG', and, a zenith position 11" of the antenna shown in dash line outline with its axis vertical and extending through its zenith center of gravity position CG". In the zone of much normal coverage of the heavens, antenna 11 will be utilized in or adjacent its full line outline position shown in FIGURES 1 and 2 with its center of gravity position CG substantially in alignment with or adjacent an azimuth axis 12 comprising the axis of a vertical journal 13 by means of which the selected azimuth position or movement of antenna 11 around the horizon is obtainable irrespective of its altitude. Preferably, the respective azimuth and elevation drive means for the device illustrated are coordinated through a director in a known manner so that the device will track while moving in azimuth and elevation simultaneously, or separately if desired, in accordance with controlling signals or impulses. As shown, antenna 11 is provided with a rigid framework 14 made of welded or bolted latticework members to provide strength and rigidity in the general form of a parabolic dish. Such framework may include a rectilinear cage or truss frame 15 at the rear of the crown or apex 16 of the antenna.

In the illustrated device, a parabolic reflector face 17 is provided and may be made of lightweight sheet material, perforated if desired for reduction of wind resistance and affixed to the latticework 14. A tripod support 18, which may have more than three legs, is also rigidly affixed to antenna 11 and carries a microwave energy unit 19 positioned securely at the focal point of the antenna. As shown, tripod 18 has four legs, two on each side of a vertical plane through the axis of antenna 11, the lower ends of the upper two legs being fixed thereto above the apex thereof a distance less, measured from the apex, than the anchor positions of the lower ends of the two lower legs of the tripod 18 to further promote the stability of the new device.

Tracking mount 10 includes a conical base 20 having upwardly tapered structural metal elements 21 covered by a weatherproof covering 22 made of sheet material, laminated plastic or other suitable substance, with an access door 23 provided therein in a hinged manner so that the interior of base 20 can be entered. The structural members 21 are fastened to a concrete foundation 24 as by anchor bolts, which foundation is set level upon the ground 25 or another grade in a location suitable for the swinging of antenna 11 to view the heavens or to track objects or for other purposes. If desired, base 20 may be sectionalized so that the upper part and lower parts can be joined by bolts or other means at a horizontal parting place 20'.

In the embodiment shown, the lower portion of base 20 is provided with motor brackets 26 fastened thereto and spaced 120° apart around axis 12. A reversible hydraulic motor 27 is secured to each bracket 26 and driven by hydraulic fluid in the desired direction of rotation through servo-mechanism connections 28. The armatures of the respective motor 27 are each fixed to a pinion gear 29 which meshes with a driven gear 30 rigidly secured to the bottom of the journal 13 in coaxial relation thereto. Known controls for such motors may be provided so that one or more can be used to drive gear 30 in a selected direction at a selected speed or speeds, acceleration and deceleraton, as desired. When two such motors are used as a drive, the remaining motor may be used in opposition to reduce backlash, or all three motors may be used as a drive in the selected direction for azimuth movement.

The upper part of base 20 above parting line 20' includes a vertical bearing 31 for journal 13, said bearing having a housing 31' between upper and lower fixed races 32, which cooperate respectively with upper and lower races 33 in and rotatable with the respective collars 34 fixed to the exterior of journal 13. The cooperating fixed and movable races are provided with frictionless bearings, which at least together take care of resisting thrust either up or down along axis 12 and radial pressure, a frictionless bearing 49 of the "Messenger X" type being illustrated in FIGURE 5. Journal 13 is a hollow shaft the upper end of which is bolted to an annular cover plate 35, the outer rim of which overlies the inner edge of a hub 36 of a platform 37. Plate 35 is also bolted to hub 36 to secure it in place in rigidly fixed relationship to journal 13. Electrical conductors for energy unit 19 may pass down through the interior of journal 13 if desired.

Platform 37 may take many forms but as shown comprises a wide supporting member having a pair of laterally spaced forwardly extending arms 38. Further, platform 37 is provided with a pair of rearwardly extending arms 39 having the same lateral spacing as arms 38 but a greater length and distance from azimuth axis 12 for a purpose described below. Such lateral spacing respectively of the pairs of forward and rearward arms promotes stability. The rearward arms 39 are provided with bifurcated ends 40 for pivotal connection to trunnioned cylinders 41. Such cylinders 41 are double-acting hydraulic cylinders or other linear actuator such as ball screws preferably with respectively extensible members 42 to be extended and retracted in unison pursuant to a flow of hydraulic fluid to each cylinder or fluid motor at a predetermined rate and in a predetermined direction through a servo-mechanism 43 in a known manner from a control or director regulating altitude movement of the new device.

The forward arms 38 are provided with holes therethrough in horizontal alignment and define a horizontal axis for pivot bolts 44 which define a horizontal elevation axis for antenna 11. Such pivotal connection for pivots 44 is made with registering holes in sockets provided at the respective ends of the lower rearward horizontal rail 45 in the frame 15. Sockets are also provided at the respective ends of the intermediate rear rail 46 in frame 15 for pivotal connection by pivot bolts 47 to the outer "eye" ends 48 of the respective piston rods 42 in cylinders 41. Thus, when the piston rods 42 are substantially fully retracted, the antenna will be in the zenith position 11" and when they are substantially fully extended, the antenna will be in the horizon position 11'. In these respective extreme positions, the center of gravity positions CG" and CG' are always in the same plane passing through axis 12 and are substantially equidistant from that axis; and the center of gravity remains in that plane during all elevation movements of antenna 11, such plane swinging horizontally in accordance with rotational movements of journal 13. Consequently, there is relatively better balance for asymmetrical structure 11 and in many routine working positions the center of gravity will be in general alignment with or adjacent to journal 13; and better force component relationships are insured to provide more ready and faster response movement either horizontally or vertically, or both, about the respective axes of movement of member 11. Still further, there is relatively less weight in the new construction for given conditions and relatively greater stability because of reduced headroom requirements and other factors present in new constructions embodying my invention. Withal, such new constructions are relatively uncomplicated and can be easily dismantled, transported and re-erected if desired when structural parts are bolted one to another rather than being a predominantly welded fixed site construction.

Although the illustrated embodiment is provided with a laterally balanced pair of elevation actuators, a single such actuator may be utilized instead if desired and locations of the respective pivot connections may be varied. Still further, other modifications in details of the illustrated embodiment and other constructions may be provided employing principles of the aforesaid invention without departing from the spirit of my invention or the scope of the appended claims.

I claim:

1. A tracking mount for a dished antenna structure or the like with two axes of movement, comprising, in combination, an upwardly tapering supporting base, a bearing mounted centrally in the upper portion of said base with the axis of said bearing substantially vertical, a substantially vertical journal supported in said bearing for rotation only, means to rotate said journal, a platform fixed to said journal immediately above said base for the horizontal rotation of said structure, said platform having a pair of laterally spaced forwardly extending arms and a pair of laterally spaced rearwardly extending arms, a cubical frame fixed to the rear central portion of said structure and having a lower horizontal rail below the center of gravity of said structure in all positions thereof, means to pivotally connect said forwardly extending arms to said rail to form a horizontal axis of rotation for the vertical rotation of said structure, extensible means pivotally connected about vertically variably spaced horizontal axes between said rearwardly extending arms and the central portion of said frame to regulate the angle of elevation of said structure, said horizontal pivotal connections being so constructed and arranged that the center of gravity of said structure when its axis is substantially fully horizontal and vertical respectively is a like predetermined distance to each side of the axis of said journal but in opposite directions and the path of movement of the said center of gravity is in a single plane substantially passing through said last-mentioned axis.

2. A tracking mount as set forth in claim 1, in which said means to rotate said journal includes a driven gear fixed to a lower portion of said journal, a plurality of pinions meshing with said driven gear in substantially equilateral positions relative to one another and hydraulic motor means to rotate at least one of said pinions respectively to regulate the direction and extent of azimuth rotation of said journal and thereby of said mount and structure.

3. A tracking mount as set forth in claim 1, in which said extensible means includes double-acting hydraulic cylinders with pistons and trunnion bearings extending between said cylinders and said rearwardly extending arms respectively, said pistons being pivotally connected at their upper ends to said central portion of said frame.

4. A tracking mount as set forth in claim 1, in which said center of gravity is substantially adjacent the axis of said journal when said structure is directed toward the heavens intermediate horizon and zenith.

5. A tracking mount for a dished antenna structure or the like with two axes of movement, comprising, in combination, a supporting base, a bearing mounted centrally in the upper portion of said base with the axis of said bearing substantially vertical, a vertical journal supported in said bearing for rotation, means to rotate said journal, a platform fixed to said journal above said base for horizontal rotation and support of said structure, said platform having a forwardly extending member and a rearwardly extending member, said forwardly extending member being pivotally connected to the rear lower central portion of said structure below the center of gravity of said structure in all positions thereof to form a horizontal axis of rotation for the vertical rotation of said structure, extensible means pivotally connected about respective horizontal axes between said rearwardly extending member and a higher central portion of said structure to regulate the angle of elevation thereof, said pivotal connections being so constructed and arranged that the center of gravity of said structure when its axis is substantially fully horizontal and vertical respectively is a predetermined distance to each side of the axis of said journal but in substantially opposite direction.

References Cited in the file of this patent

UNITED STATES PATENTS 2,463,648    Schultz _____ Mar. 8, 1949

OTHER REFERENCES

Electrical Engineering, pp. 196–199, March 1957.